(12) United States Patent
Barton

(10) Patent No.: US 8,839,990 B2
(45) Date of Patent: Sep. 23, 2014

(54) MACHINE FOR DISPENSING CHOCOLATE CLUSTERS

(76) Inventor: Robert G. Barton, Hartville, OH (US)

( * ) Notice: Subject to any disclaimer, the term of this patent is extended or adjusted under 35 U.S.C. 154(b) by 133 days.

(21) Appl. No.: 13/334,358

(22) Filed: Dec. 22, 2011

(65) Prior Publication Data

US 2012/0164289 A1  Jun. 28, 2012

Related U.S. Application Data

(60) Provisional application No. 61/426,258, filed on Dec. 22, 2010.

(51) Int. Cl.
| | |
|---|---|
| *B67D 7/80* | (2010.01) |
| *A23G 1/54* | (2006.01) |
| *A23G 1/20* | (2006.01) |
| *A23G 1/48* | (2006.01) |
| *A23G 3/34* | (2006.01) |
| *A23G 3/20* | (2006.01) |
| *A23G 1/00* | (2006.01) |

(52) U.S. Cl.
CPC .. *A23G 1/54* (2013.01); *A23G 1/20* (2013.01); *A23G 1/48* (2013.01); *A23G 3/0065* (2013.01); *A23G 3/2007* (2013.01); *A23G 1/206* (2013.01); *A23G 1/005* (2013.01)
USPC .......................... 222/146.1; 426/302; 222/249

(58) Field of Classification Search
CPC .......... A23G 1/206; A23G 1/20; A23G 1/48; A23G 1/54; A23G 1/005; A23G 3/0065; A23G 3/2007
USPC ............... 222/146, 1, 146.2, 146.6, 249, 250, 222/253, 402, 402.16, 305, 308, 309, 318, 222/386; 426/302
See application file for complete search history.

(56) References Cited

U.S. PATENT DOCUMENTS

| | | | | |
|---|---|---|---|---|
| 2,183,370 | A * | 12/1939 | Selitzky | 222/380 |
| 4,159,784 | A * | 7/1979 | d'Autry | 222/32 |
| 4,230,160 | A * | 10/1980 | Buckley | 141/116 |
| 5,524,683 | A * | 6/1996 | Mueller | 141/129 |
| 6,174,157 | B1 * | 1/2001 | Daouse et al. | 425/218 |
| 6,405,897 | B1 * | 6/2002 | Jepson et al. | 222/108 |
| 7,387,221 | B2 * | 6/2008 | Masuda | 222/333 |

* cited by examiner

*Primary Examiner* — Lien Ngo
(74) *Attorney, Agent, or Firm* — Zollinger & Burleson Ltd.

(57) ABSTRACT

A cluster dispensing machine dispenses clusters having a hand-formed appearance while minimizing broken and crushed aggregate. The dispensing machine uses a flexible pinch valve to meter the chocolate and aggregate mixture. The flexible pinch valve minimizes broken and crushed aggregate. The machine drops the metered chocolate and aggregate mixture onto a conveyor in order to provide a hand-formed appearance to the clusters.

20 Claims, 8 Drawing Sheets

US 8,839,990 B2

MACHINE FOR DISPENSING CHOCOLATE CLUSTERS

CROSS REFERENCE TO RELATED APPLICATIONS

This application claims the benefit of U.S. Provisional Application 61/426,258 filed Dec. 22, 2010; the disclosure of which is incorporated herein by reference.

BACKGROUND

1. Technical Field

The disclosure generally relates to food processing equipment and, more particularly, to equipment for processing chocolate. Specifically, the disclosure relates to a machine used to dispense chocolate clusters without breaking the aggregate in the clusters.

2. Background Information

One of the more popular chocolate food items is a chocolate cluster. A chocolate cluster includes an aggregate food item disposed randomly in a chocolate binder. The aggregate may be essentially any food item that consumers enjoy eating in combination with chocolate. Examples of aggregate include nuts, fruit, candy, salted snack items, and any other item that may be consumed with chocolate. Those in the chocolate industry recognize the most desirable chocolate clusters are those made by hand. Hand formation is desirable because the person making the cluster does not break or crush the aggregate and randomly forms the cluster. The consumer values whole aggregate especially when the aggregate is nuts or small pieces of fruit. Hand forming clusters is labor intensive and time consuming and is thus expensive. The industry thus desires an automated cluster manufacturing machine that forms clusters filled with substantially unbroken aggregate and having a hand-formed appearance.

SUMMARY OF THE DISCLOSURE

The disclosure provides a chocolate cluster dispensing machine that dispenses chocolate clusters having a hand-formed appearance while minimizing broken and crushed aggregate. The dispensing machine uses a flexible pinch valve to meter the chocolate and aggregate mixture. The flexible pinch valve minimizes broken and crushed aggregate. The machine drops the metered chocolate and aggregate mixture onto a conveyor in order to provide a hand-formed appearance to the cluster.

One configuration of the machine includes a dispensing apparatus having a valve assembly that includes a valved inlet, a valved outlet, and an intermediate access port that is in fluid communication with the adjustable chamber of a piston cylinder. The valves controlling the inlet and outlet are flexible pinch valves. The flexible pinch valve tends to close around the aggregate instead of crushing the aggregate in the manner of a hard valve. In one configuration, each valve has an outer body and a flexible sleeve disposed within the outer body. A chamber is defined between the interior of the outer body and the exterior of the flexible sleeve. This chamber is in selective fluid communication with a source of pressurized air and, optionally, a vacuum source. When the chamber is exposed to pressurized air, the center of the sleeve is forced closed while its ends are held at the outer body. This configuration provides a closed valve with a tapered inner sleeve profile. Subjecting the chamber to atmospheric pressure or a vacuum source opens the valve. As an alternative to the use of pressurized air, the flexible sleeve may be pressed closed from one or a plurality of angles with a mechanical finger. These flexible pinch valves have been found to be gentle with delicate aggregate because they will push aggregate near the touch point of the inner sleeve out of the way and can even close directly over some aggregate without crushing the aggregate given the flexibility of the sleeve.

The disclosure also provides a configuration wherein at least a portion of the dispensing apparatus is disposed within a heated housing to prevent the chocolate from solidifying within the dispensing apparatus.

The disclosure provides a stainless steel case that isolates the control portion of the dispensing machine from the dispensing apparatus thus allowing the user to readily clean the machine in accordance with health codes.

The disclosure provides a configuration wherein the stroke length of the piston cylinder may be adjusted to adjust the size of the cluster that is dispensed.

The disclosure also provides a configuration wherein the number, size, and shape of the dispensing outlets may be varied to allow the machine to dispense different-sized and different-shaped clusters at the same time.

The disclosure also provides an adjustable system for closing the flexible pinch valves such that the closure speed and closure force of the valves may be varied to work with different aggregates.

The disclosure also provides a method for dispensing chocolate clusters with a machine wherein the clusters have a hand-formed appearance and the breaking and crushing of the aggregate is minimized.

In one configuration, the disclosure provides a method that includes the steps of holding a chocolate and aggregate mixture in a supply with at least a portion of the chocolate heated to a temperature that renders it flowable. The melted chocolate and aggregate are drawn out of the supply into a dispensing apparatus and then pushed out of the dispensing apparatus wherein the mixture drops onto a conveyor to form the cluster. The dispensing apparatus uses a piston cylinder and a valve assembly with first and second flexible valves to control the loading and unloading of the dispensing apparatus. In order to dispense a cluster, the first valve between the valve assembly and the storage chamber is opened and the outlet valve is closed. The piston cylinder is then moved from its dispensed position to its loaded position. This movement creates a suction force that draws a chocolate and aggregate mixture from the supply thought the first valve into the valve assembly. The conditions of both valves are then changed and the piston cylinder is used to push the mixture out from the valve assembly. The stroke length of the piston cylinder may be adjusted to adjust the size of the cluster.

The dispensed chocolate and aggregate mixture is allowed to free fall a short distance from the machine onto a conveyor. The dispensed mixture may be divided after being dispensed from the valve assembly so that multiple clusters are formed each time the piston cylinder returns to the dispensed position. The conveyor may move the clusters through a cooling device so that the clusters may be packaged for shipment or sale.

BRIEF DESCRIPTION OF THE DRAWINGS

Similar numbers refer to similar parts throughout the specification.

DETAILED DESCRIPTION OF THE INVENTION

Figure 1:
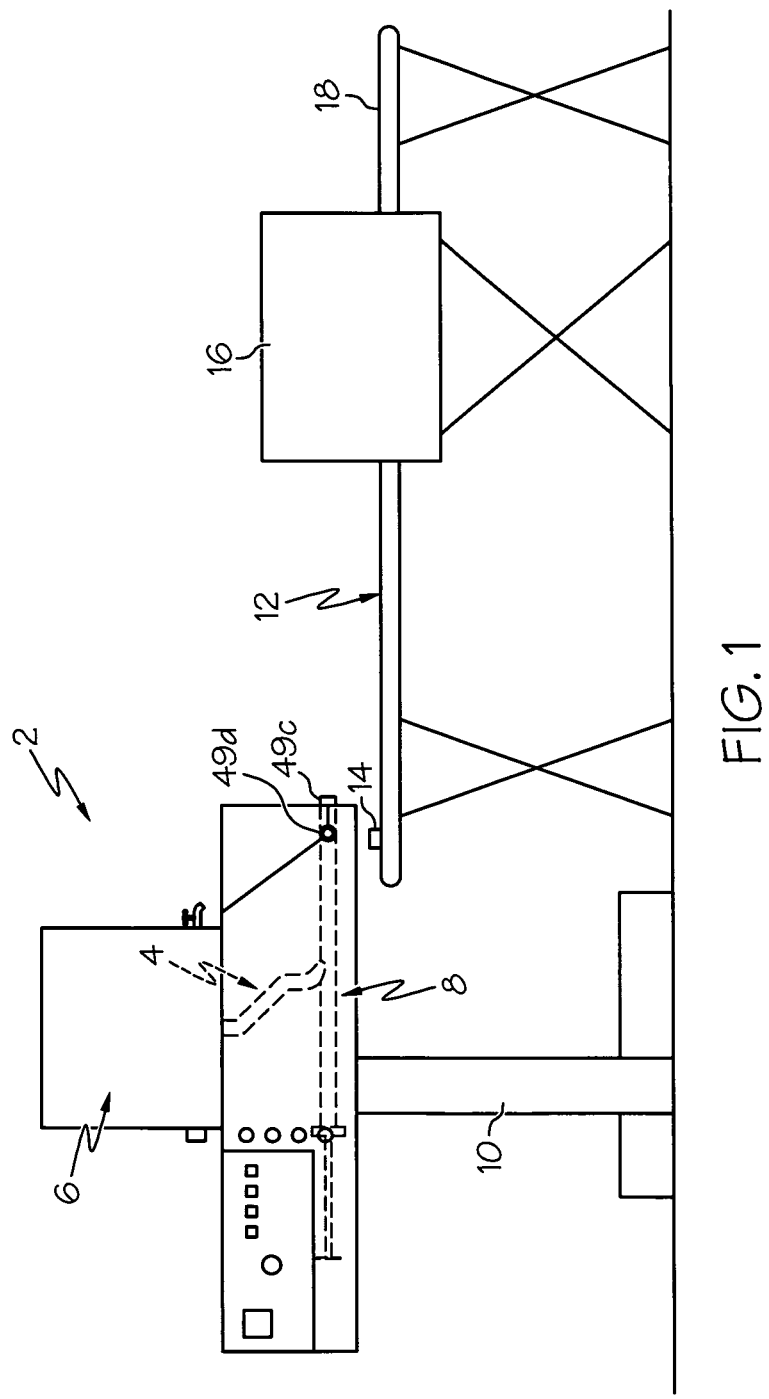
FIG. 1 is a side schematic view of the dispensing machine on a floor stand next to a conveyor that passes through a cooling chamber.
Figure 2:
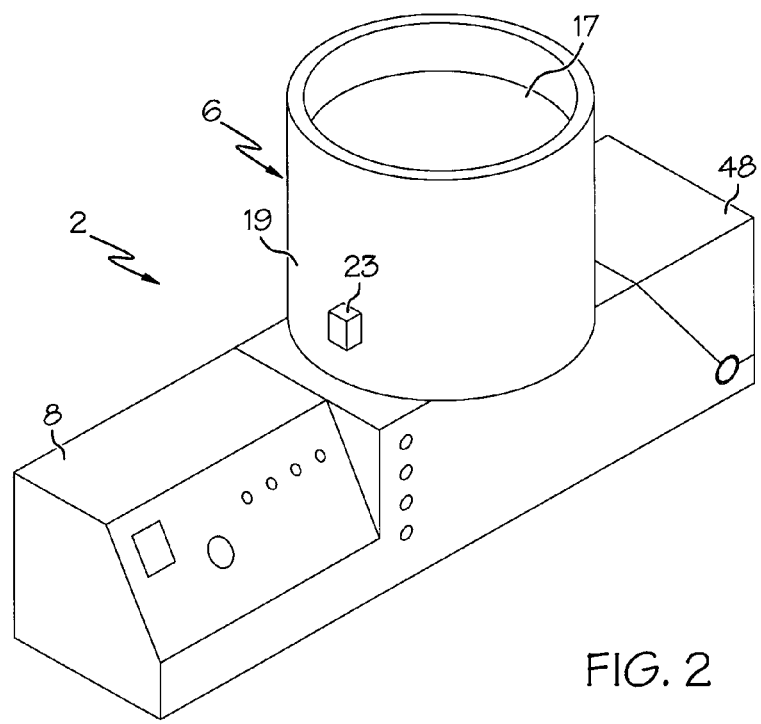
FIG. 2 is a perspective view of one configuration of the cluster dispensing machine.
Figure 3:
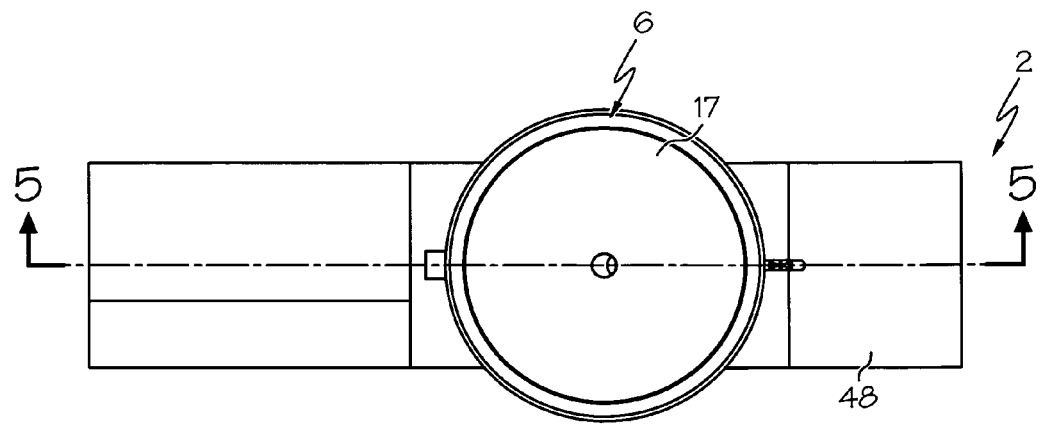
FIG. 3 is a top plan view of FIG. 2.
Figure 4:
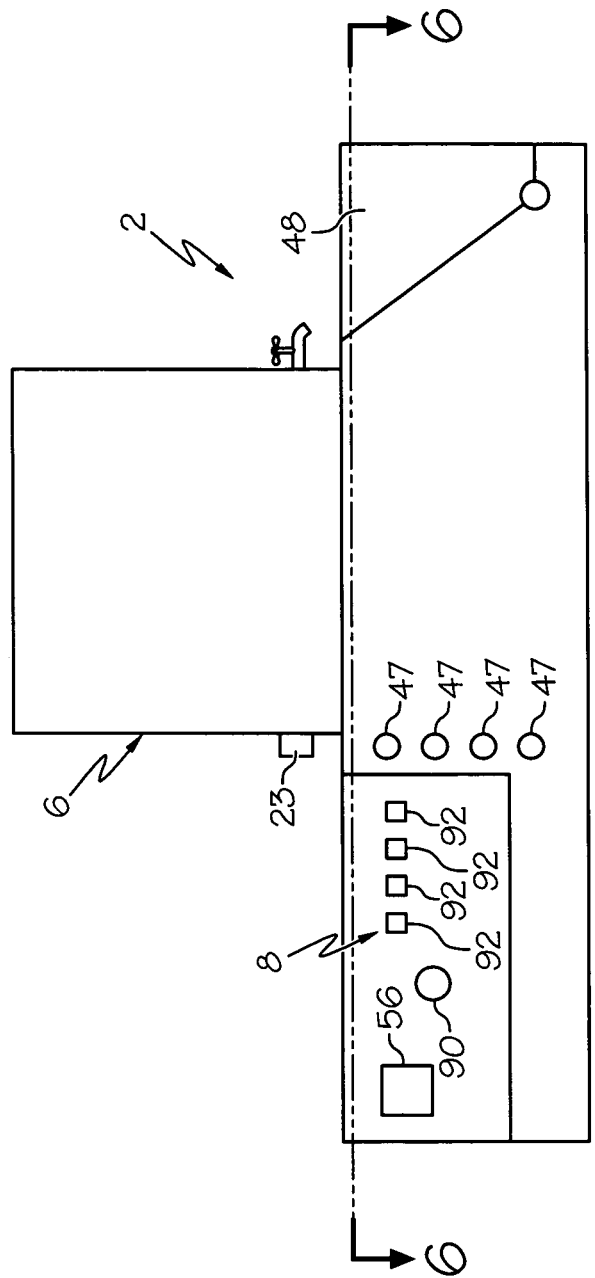
FIG. 4 is a side elevation view of FIG. 2.

An exemplary configuration of the cluster dispensing machine is indicated generally by the numeral 2 in the accompanying drawings. Machine 2 generally includes a dispensing apparatus 4 in communication with a chocolate and aggregate mixture supply 6. Dispensing apparatus 4 and mixture supply 6 may be carried together by a housing 8 that, in turn, may be carried by an adjustable-height floor stand 10. A conveyor 12 may be used to catch clusters 14 dispensed from apparatus 4. A cooling chamber 16 may be used to solidify clusters 14 before they enter a packaging zone 18.

Alternatively, housing 8 may be configured to have stand 10 integral to its structure or housing 8 may be configured to be mounted to a table top or to be carried by another piece of equipment. Supply 6 may be integral to housing 8 or placed at an independent location.

Figure 5:
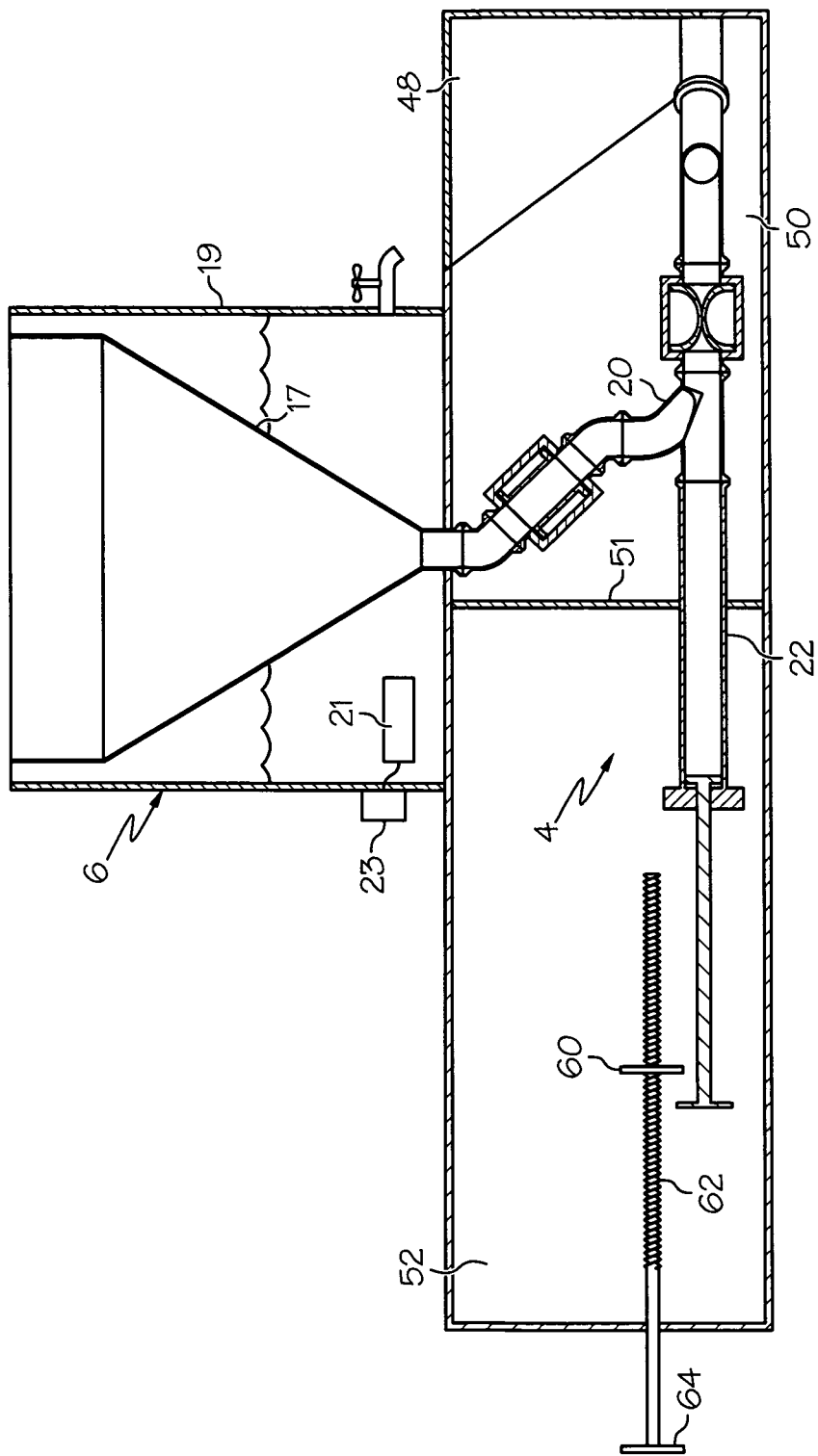
FIG. 5 is a section view taken along line 5-5 of FIG. 3.
Figure 6:
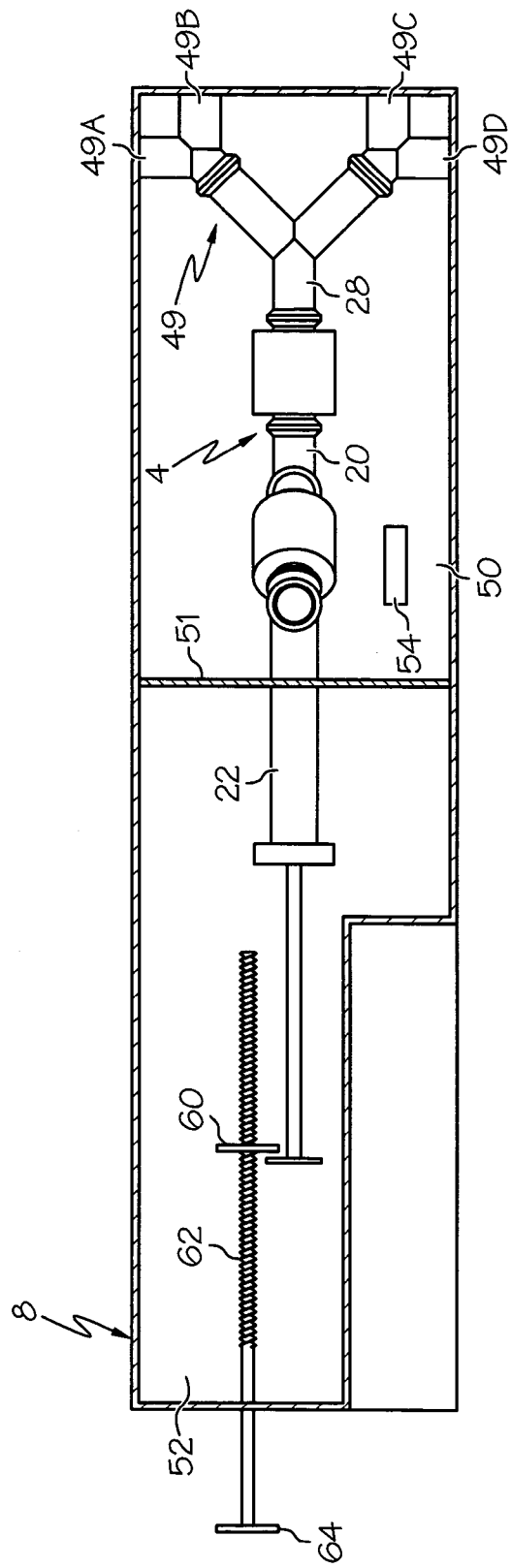
FIG. 6 is a section view taken along line 6-6 of FIG. 5.

In the exemplary configuration of machine 2 depicted in the drawings, supply 6 is a heated double-walled container (see FIG. 5) into which the user places the chocolate and the aggregate. The container includes a conical inner wall 17 that tapers down to an outlet. The outer wall 19 is a right cylinder such that a chamber is defined between the inner and outer walls. The chamber is heated so that the chocolate in supply 6 melts. The chamber may contain water that is heated with an electric heater 21 controlled by a thermostat 23. The chocolate and aggregate mix naturally as the chocolate melts and as the mixture moves down along a tapered inner wall of the container to the outlet that is, in turn, connected to the inlet of dispensing apparatus 4. Supply 6 includes an adjustable heater that may be controlled to heat the mixture in the container at different temperatures depending on the surrounding environment and the nature of the mixture. The container may include a mixer that evenly distributes the aggregate throughout the chocolate. Alternatively, supply 6 may include separate supplies of chocolate and aggregate which are mixed only immediately before passing into the inlet of dispensing apparatus 4. A secondary outlet may be provided to the exterior of supply 6 so that mixture or wash water may be removed from supply without the need for moving the material through dispensing apparatus 4.

Dispensing apparatus 4 generally includes a valve assembly 20 and a piston cylinder 22. Valve assembly 20 defines an inlet tube 24 that defines the inlet that receives the mixture from supply 6. Inlet tube 24 is opened and closed with a first valve 26. Valve assembly 20 also defines an outlet tube 28 that defines the outlet of dispensing apparatus 4. Outlet tube 28 is opened and closed with a second valve 30. Valve assembly 20 further defines an intermediate chamber or tube 32 that defines an intermediate access port that provides fluid communication between inlet and outlet tubes 24 and 28 and piston cylinder 22. These elements may be integral to the body of valve assembly 20 but also may be detachable components that allow the valve assembly to be disassembled for cleaning. Inlet valve 26, outlet valve 30, and intermediate tube 32 may be connected together with clamps 34 that engage flanges defined by the ends of the elements. Each clamp 34 includes a pair of hinged clamshell portions that are threaded together on the side opposite the hinge so that the tightness may be adjusted. The interior of each clamshell portion engages the flanges of the ends of the elements to act to force the elements together when clamps 34 are tightened. Clamps 34 allow the entire valve assembly to be disassembled by hand for cleaning.

Each of the first 26 and second 30 valves is a flexible pinch valve that is configured to minimize the breaking or crushing of the aggregate disposed in the mixture. Each valve thus includes a flexible sleeve 40 that defines a through chamber. Each sleeve includes upstream and downstream ends that are secured to the outer tube wall to define a valve chamber 42. In the exemplary configuration, sleeve 40 is secured to the inner surface of the tube end walls.

In one configuration, each valve 26 and 30 is moved between its open and closed configuration with the selective delivery and release of pressurized air to chamber 42. The pressurized air is delivered to chamber 42 with a supply line 43 disposed in the middle of the valve. When chamber 42 is exposed to pressurized air, sleeve 40 is forced against itself to expand chamber 42 thus closing the valve. When chamber 42 is exposed to a vacuum flow or when permitted to return to atmospheric pressure, sleeve 40 returns to its resting position to open the valve. Sleeve 40 is a flexible material that will not necessarily break or crush aggregate that is disposed in the area where sleeve engages itself to close the valve. When closed, sleeve 40 is tapered on both sides of the closure area such that aggregate will be push out away from the closure area. Even if aggregate is trapped in the closure area, the flexibility of sleeve 40 allows it to close directly around aggregate with crushing. Valves 26 and 30 may be supplied by Richway Industries, Ltd., of Janesville, Iowa. The invention also may use hydraulic flexible pinch valves as a substitute for the pneumatic valves.

The speed of the delivery of pressurized air to chamber 42 may be controlled in order to control how fast or how slow sleeve 40 closes. The user also may control the overall pressure of the air to control how hard the valve closes. The pressurized air used to control valves 26 and 30 may be provided from a compressor 44, a tank of compressed air, or a delivery tube in communication with a remote compressor or tank (such as shop air). The delivery and removal of the pressurized air is controlled with a plurality of air delivery valves 46. A programmable controller may be used to open and close the valves with sensors associated with each valve to indicate the state of each valve. These sensors may provide a signal to pressure indicators 47 that allow the user to monitor the status of each valve. Pressure indicators 47 also may display the status of the piston cylinders used throughout the device.

Figure 10:
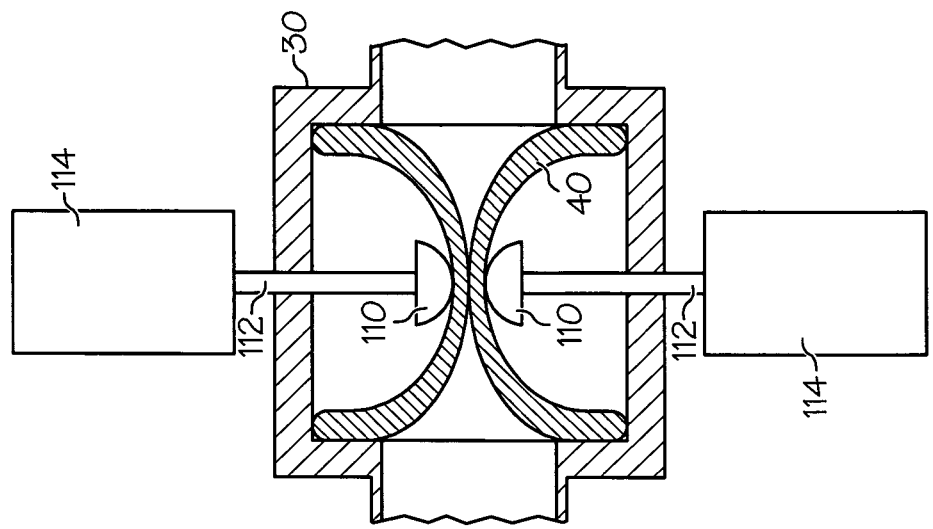
FIG. 10 depicts a mechanically-actuated valve in the closed configuration.
Figure 9:
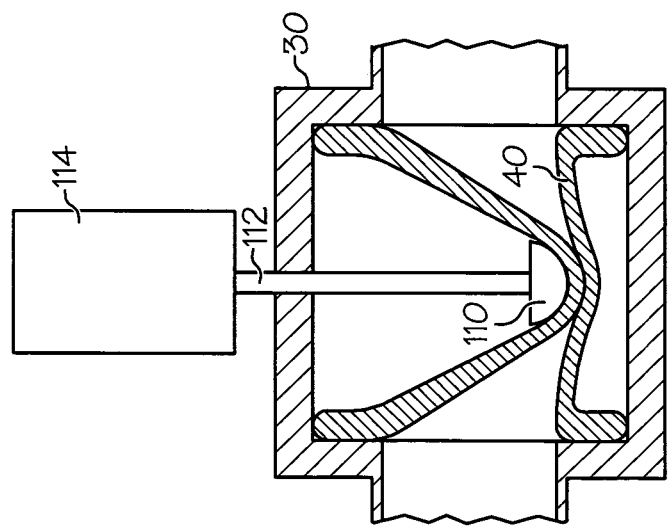
FIG. 9 depicts a mechanically-actuated valve in the closed configuration.

Another configuration of the invention uses mechanically-actuated first 26 and second 30 valves or a combination of mechanically-actuated and pneumatically-actuated valves. One mechanically-actuated valve that may be used with the chocolate and aggregate includes sleeve 40 that is closed by pressing an actuator (or a plurality of actuators) into the flexible sleeve to collapse sleeve 40 to a closed configuration. Each actuator may use a rounded head 110 on the end of a rod 112 to compress the flexible sleeve. (FIGS. 9 and 10). Each actuator may be driven by a piston cylinder arrangement, a cam and follower arrangement, a rotating drive member, or other similar mechanisms 114 known to those skilled in the art.

In some configurations of the invention, the outlet of outlet tube 28 is disposed above conveyor 12 such that clusters are formed directly from outlet tube 28. In other configurations of machine 2, a cluster outlet tube 49 is used to further treat the mixture that is being pushed out of dispensing apparatus 4. Cluster outlet tube 49 may divide the mixture into a plurality of streams and deliver each of them to a separate outlet such that a plurality of clusters are formed each time machine 2 cycles. In the exemplary configuration, cluster outlet tube 49 defines four outlets 49a, 49b, 49c, and 49d with two outlets 49b and 49c disposed on the front of housing 8 and two outlets 49a and 49d disposed on the sides of housing 8. Conveyor 12 may be positioned under all four of these outlets 49 such that four rows of clusters 14 are formed on conveyor 12. Alternatively, a plurality of conveyors 12 may be used. One conveyor 12 may be used for each outlet or one conveyor may be used for a portion of the outlets with another or other conveyors being used for the remaining outlets. Cluster outlets may be sized different to provide different-sized clusters 14. Each outlet may have a different cross section or edge shape to provide a different appearance to the clusters 14.

The front end 48 of housing 8 may be pivoted upwardly and back onto the top of housing 8 to provide good access to the valve assembly 20 and the outlets 49a-d. A seal or gasket is disposed about the perimeter of front end 48 to seal the interior of housing 8 when front end 48 is closed.

At least valve assembly 20 is heated to prevent the mixture disposed inside valve assembly 20 from solidifying. In the exemplary configuration, housing 8 is divided by a divider wall 51 into a forward food handling portion 50 and a rearward control portion 52. The interior of forward portion 50 is heated to maintain valve assembly at a temperature high enough to maintain the chocolate in a flowable state. The interior of forward portion 50 may be heated with an electric heater 54. A temperature controller and an indicator 56 are provided to monitor the temperature in forward portion 50 and to allow the user control the temperature.

The stroke of piston cylinder 22 may be adjusted mechanically by placing a stop switch 60 in the path of the piston. The position of stop switch 60 with respect to housing 8 may be adjusted. In one configuration of the invention, stop switch is carried on a threaded screw 62 such that rotation of screw 62 changes the position of stop switch 60 and thus the overall stroke of the piston. Screw 62 may be rotated with a handle 64 disposed outside housing 8. Handle 64 may be connected directly to screw 62 or geared to screw 62. When the head of the piston trips stop switch 62, a valve delivering pressurized air to piston cylinder 22 is switched and the direction of the piston movement is reversed. The piston moves forward until it reaches the dispensed position wherein the control valve is triggered to reverse the supply of pressurized air again to repeat the processes. The delay between the change of direction may be varied as may be the speed of the piston stroke.

In an alternative configuration of the invention, a controller may be provided to control air delivery valves 46, piston cylinder 22, heater 54, and any mixer and/or heater on supply 6. The controller may be a computer or a dedicated programmable controller. In another configuration of the invention, the controller may be used to vary the length of the stroke of piston cylinder 22. In such a configuration, the stroke length may be randomly selected by the controller between upper and lower limits so that different-sized clusters are formed.

Indicators 47 are provided on the exterior of housing 8 so that the user of machine 2 can visually monitor; the air pressure supplied to first valve 26; the air pressure supplied to push the piston forward in the dispensing direction; the air pressure supplied to second valve 30; and the air pressure supplied to push the piston back in the loading direction.

In an optional configuration, a separate programmable controller may be provided to allow the user to control the speed of the cycle of piston cylinder 22.

Machine 2 also includes on/off switches 92 for the different components of the machine.

Figure 7:
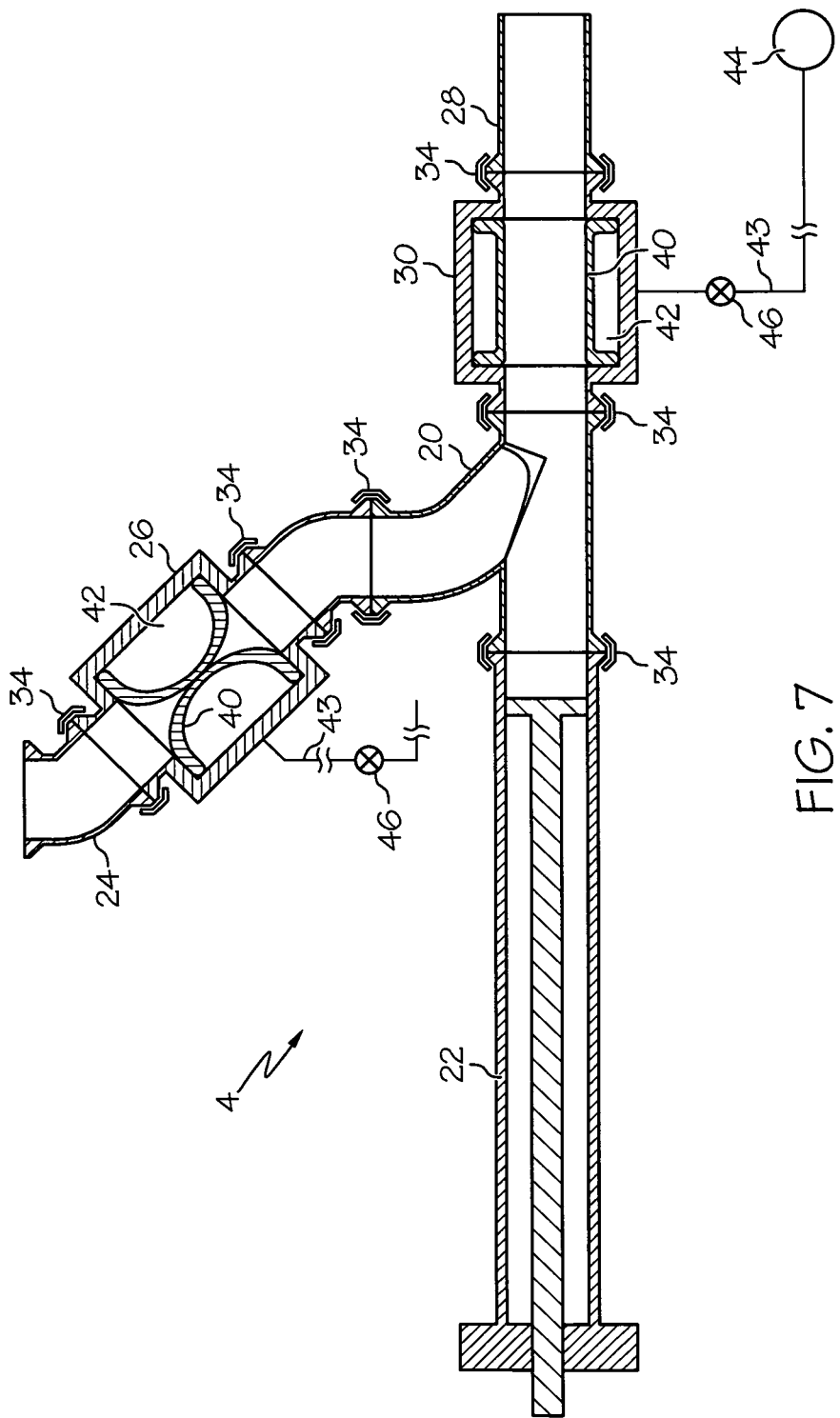
FIG. 7 is a section view of the valve assembly in the dispensed position.
Figure 8:
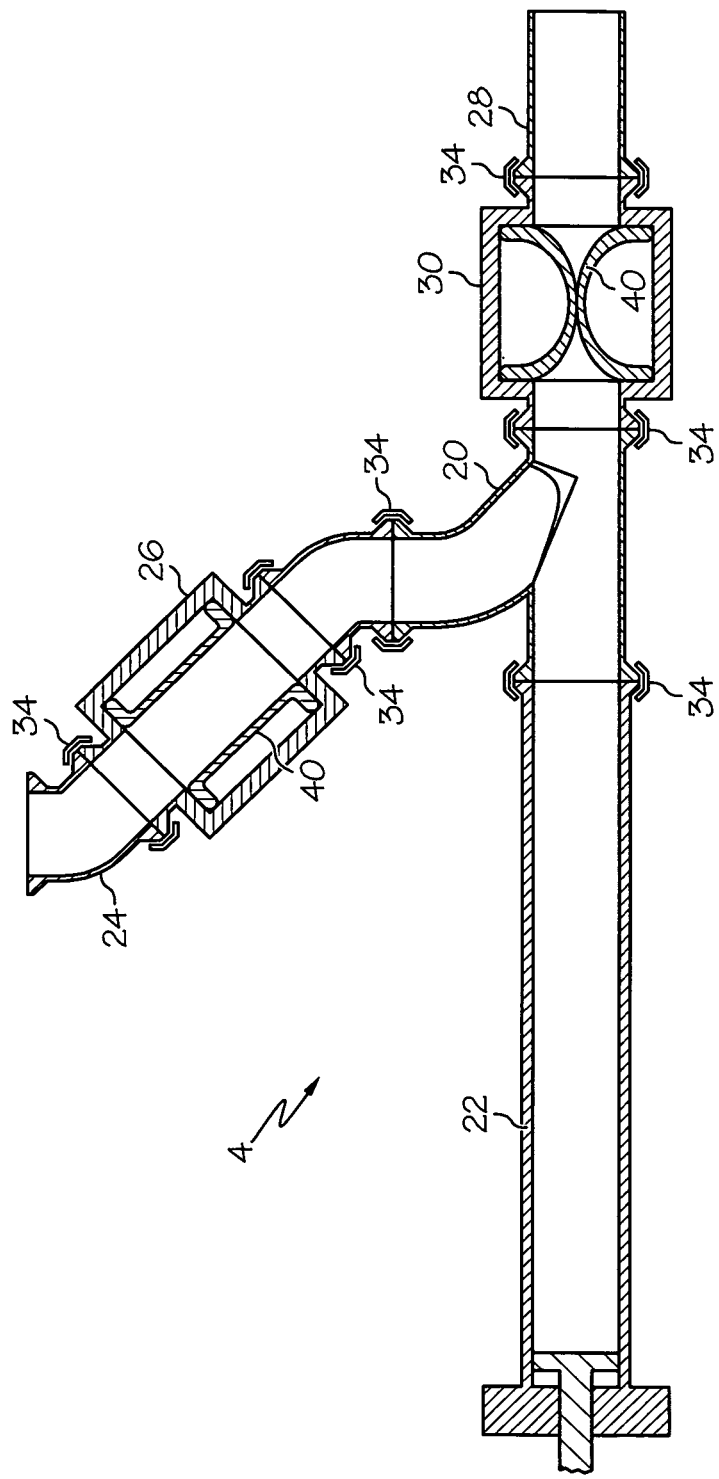
FIG. 8 is a section view of the valve assembly in the loaded position.

The user of machine 2 forms clusters 14 by loading supply 6 with the desired chocolate and aggregate. The chocolate is melted to flowable condition and flows to the inlet of inlet tube 24 which is initially closed when machine 2 is turned on. Once the controller receives a signal that supply 6 is heated to a desired temperature or has reached a desired temperature for a desired time, the controller opens first valve 26 and closes second valve 30. The controller then activates piston cylinder 22 causing it to move from its dispensed position of FIG. 7 to the loaded position of FIG. 8. This process applies a vacuum to first valve 26 which pulls a volume of mixture (defined by the piston stroke and the interior diameter of the cylinder) into first valve 26 and possible into intermediate tube 32 (and possible all the way into the cylinder. Once the piston has stopped its withdrawal, the controller reverses the condition of first and second valves 26 and 30. The controller then directs the piston cylinder to return to its dispensed condition of FIG. 7. This pushes the mixture out toward or through outlet valve 30. This process is repeated until the mixture reaches the outlet or outlets of cluster outlet tube 49 wherein the mixture starts falling out of the outlet or outlets to form clusters 14 on conveyor 12. The mixture falls out of machine 2 and lands in a random configuration on conveyor 12 based on the location of the aggregate in the slug of mixture being dispensed. The position of the aggregate is random and thus provides a non-uniform, hand-formed appearance to each cluster 14. As noted above, cluster outlet tube 49 may have a plurality of outlets such that a plurality of clusters 14 are formed in each cycle of machine 2. Conveyor 12 may move clusters 14 through cooling chamber 16 so that the clusters 14 are at least somewhat solid before being packaged for shipment or sale at packaging zone 18.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Throughout the description and claims of this specification the words "comprise" and "include" as well as variations of those words, such as "comprises," "includes," "comprising," and "including" are not intended to exclude additives, components, integers, or steps.

The invention claimed is:

1. A chocolate cluster dispensing machine, comprising:
   a chocolate and aggregate mixture supply having an outlet;
   a dispensing apparatus having an inlet in communication with the outlet of the chocolate and aggregate mixture supply; the dispensing apparatus also having an outlet and an intermediate access port;
   a piston cylinder in communication with the intermediate access port; the piston cylinder movable between dispensed and loaded positions; the movement of the piston cylinder from the dispensed position to the loaded position adapted to apply a suction force to the dispensing apparatus;
   the dispensing apparatus including first and second flexible pinch valves; each of the first and second flexible pinch valves having a flexible inner sleeve that is movable between open and closed positions; the first flexible pinch valve being disposed intermediate the inlet and the intermediate access port; and the second flexible pinch valve being disposed intermediate the outlet of the dispensing apparatus and the intermediate access port; and means for selectively controlling the movement of the flexible inner sleeves of the flexible pinch valves between the open and closed positions independent of the piston cylinder and to minimize the crushing of the aggregate in the chocolate.

2. The machine of claim 1, wherein the chocolate and aggregate mixture supply includes a heater.

3. The machine of claim 1, wherein the chocolate and aggregate mixture supply includes an inner wall and an outer wall with a chamber defined between the inner and outer walls; a liquid being disposed in the chamber; and a heater adapted to heat the liquid such that the inner wall is heated.

4. The machine of claim 3, wherein the inner wall is tapered.

5. The machine of claim 1, wherein the dispensing apparatus is disposed in a heated chamber.

6. The machine of claim 1, further comprising a conveyor disposed under the outlet of the dispensing apparatus.

7. The machine of claim 6, further comprising a cooling chamber; the conveyor passing through the cooling chamber.

8. The machine of claim 6, further comprising an adjustable stand that carries the dispensing apparatus and the chocolate and aggregate mixture supply.

9. The machine of claim 1, wherein the piston of the piston cylinder moves a distance between the dispensed and loaded positions; the distance being adjustable.

10. The machine of claim 9, further comprising a stop switch that is movable with respect to the piston cylinder to provide the adjustability of the distance moved by the piston.

11. The machine of claim 10, further comprising a threaded screw that is rotatable with respect to the piston cylinder; the stop switch engaging the threaded screw such that rotation of the threaded screw moves the stop switch with respect to the piston cylinder.

12. A chocolate cluster dispensing machine, comprising:
a chocolate and aggregate mixture supply having an outlet;
a housing defining a chamber; the chocolate and aggregate mixture supply being disposed on top of the housing;
a dispensing apparatus having an inlet in communication with the outlet of the chocolate and aggregate mixture supply; the dispensing apparatus having an outlet and an intermediate access port; a major portion of the dispensing apparatus being disposed in the chamber of the housing;
a portion of the inlet of the dispensing apparatus being disposed vertically above a portion of the intermediate access port of the dispensing apparatus;
a heater disposed in the chamber of the housing to heat the dispensing apparatus;
the housing including an end portion movable between open and closed positions; the open position of the end portion providing access to a portion of the dispensing apparatus;
a piston cylinder in communication with the intermediate access port; the piston cylinder movable between dispensed and loaded positions; the piston cylinder being adapted to load mixture into the dispensing apparatus and to push mixture from the outlet of the dispensing apparatus;
the dispensing apparatus including first and second flexible pinch valves; each of the first and second flexible pinch valves having a flexible inner sleeve that is movable between open and closed positions; the first flexible pinch valve being disposed intermediate the inlet and the intermediate access port; and the second flexible pinch valve being disposed intermediate the outlet of the dispensing apparatus and the intermediate access port; and
means for selectively controlling the movement of the flexible inner sleeves of the flexible pinch valves between the open and closed positions independent of the piston cylinder.

13. The machine of claim 12, wherein the chocolate and aggregate mixture supply includes an inner wall and an outer wall with a chamber defined between the inner and outer walls; a liquid being disposed in the chamber; and a heater adapted to heat the liquid such that the inner wall is heated.

14. The machine of claim 12, further comprising a supply of pressurized air in selective communication with the first and second flexible pinch valves.

15. The machine of claim 12, further comprising a conveyor disposed under the outlet of the dispensing apparatus.

16. The machine of claim 12, further comprising a cooling chamber; the conveyor passing through the cooling chamber.

17. A chocolate cluster dispensing machine, comprising:
a chocolate and aggregate mixture supply having an outlet;
a dispensing apparatus having an inlet in communication with the outlet of the chocolate and aggregate mixture supply; the dispensing apparatus also having an outlet and an intermediate access port;
a piston cylinder in communication with the intermediate access port; the piston cylinder movable between dispensed and loaded positions; the movement of the piston cylinder from the dispensed position to the loaded position adapted to apply a suction force to the dispensing apparatus;
the dispensing apparatus including first and second flexible pinch valves; each of the first and second flexible pinch valves having a flexible inner sleeve that is movable between open and closed positions; the first flexible pinch valve being disposed intermediate the inlet and the intermediate access port; and the second flexible pinch valve being disposed intermediate the outlet of the dispensing apparatus and the intermediate access port; and
a valve control apparatus associated with each valve; the apparatus selectively controls the movement of the flexible inner sleeves of the flexible pinch valves between the open and closed positions independent of the piston cylinder; the valve control apparatus including a head that is selectively pushed into the flexible inner sleeve of the valve to close the valve.

18. The machine of claim 17, wherein the head is rounded.

19. The machine of claim 18, wherein the rounded head is carried on a rod.

20. The machine of claim 17, wherein the valve control apparatus includes a plurality of heads that are selectively pushed into the flexible inner sleeve of the valve to close the valve.

* * * * *